United States Patent [19]
Machida et al.

[11] Patent Number: 5,340,528
[45] Date of Patent: Aug. 23, 1994

[54] INJECTION/COMPRESSION MOLDING METHOD, A DIE FOR INJECTION/COMPRESSION MOLDING AND AN INJECTION/COMPRESSION MOLDING MACHINE

[75] Inventors: Tetsuo Machida; Hiroyuki Kiso; Nobuyuki Sasaki; Hiroshi Kondo, all of Miyagi, Japan

[73] Assignee: Sony Corporation, Japan

[21] Appl. No.: 18,305

[22] Filed: Feb. 16, 1993

[30] Foreign Application Priority Data

Feb. 21, 1992 [JP] Japan .................... 4-035173

[51] Int. Cl.[5] .............. B29C 45/40; B29C 45/56
[52] U.S. Cl. .................. 264/328.7; 264/334; 425/139; 425/555; 425/556
[58] Field of Search .......... 264/40.5, 328.1, 328.7, 264/334; 425/129.2, 139, 554, 555, 556

[56] References Cited

U.S. PATENT DOCUMENTS

| | | | |
|---|---|---|---|
| 3,670,066 | 6/1972 | Valyi | 264/328.7 |
| 3,914,086 | 10/1975 | Hujik | 425/129.2 |
| 4,555,086 | 11/1985 | Kiyotomo | 425/556 |
| 4,820,149 | 4/1989 | Hatakeyama et al. | 425/556 |

FOREIGN PATENT DOCUMENTS

| | | | |
|---|---|---|---|
| 944113 | 3/1974 | Canada | 425/556 |
| 59-185636 | 10/1984 | Japan | 264/328.7 |
| 61-188120 | 8/1986 | Japan | 264/328.7 |
| 3-87217 | 4/1991 | Japan | 264/328.7 |
| 3-203620 | 9/1991 | Japan | 425/556 |

*Primary Examiner*—Mathieu Vargot
*Attorney, Agent, or Firm*—Ronald P. Kananen

[57] ABSTRACT

An injection molding die includes a fixed half die and a movable half die which has a core surface and which is provided with ejector pins. The ejector pins are held with their extremities retracted from the core surface to form recesses corresponding to compression allowances. The ejector pins are advanced toward the cavity to compress the compression allowances after a molten resin has been injected into the injection molding die in a manner which fills the cavity and the recesses. The compression with the ejector pins renders the pressure distribution in the cavity uniform, so that a molding can be formed with a high degree of accuracy and so that the injection molding cycle time can be reduced.

5 Claims, 11 Drawing Sheets

INJECTION/COMPRESSION MOLDING METHOD, A DIE FOR INJECTION/COMPRESSION MOLDING AND AN INJECTION/COMPRESSION MOLDING MACHINE

BACKGROUND OF THE INVENTION

1. Field of the Invention

The present invention relates to an injection/compression molding method, a die for injection/compression molding and an injection/compression molding machine suitable for forming precision injection moldings, such as half cases of tape cassettes, substrates for optical disks and optical lenses.

2 Description of the Related Art

An injection/compression molding method employs, in combination, the rapid charging function of an injection molding process and the uniform compression function of a compression molding process. The fundamental principle of injection/compression molding comprises injecting a resin in a slightly expanded cavity formed in a die, and compressing the die to reduce the volume of the cavity by a decrement corresponding to a reduction in the volume of the resin injected into the cavity resulting from liquid shrinkage on cooling to form a molding in desired dimensions.

Conventional injection/compression molding methods are classified roughly into two systems.

1. Whole Surface Compression System

The injection/compression molding method of this system is suitable for transferring a precision pattern in the surface of a molding having the shape of a flat disk.

Figure 13:
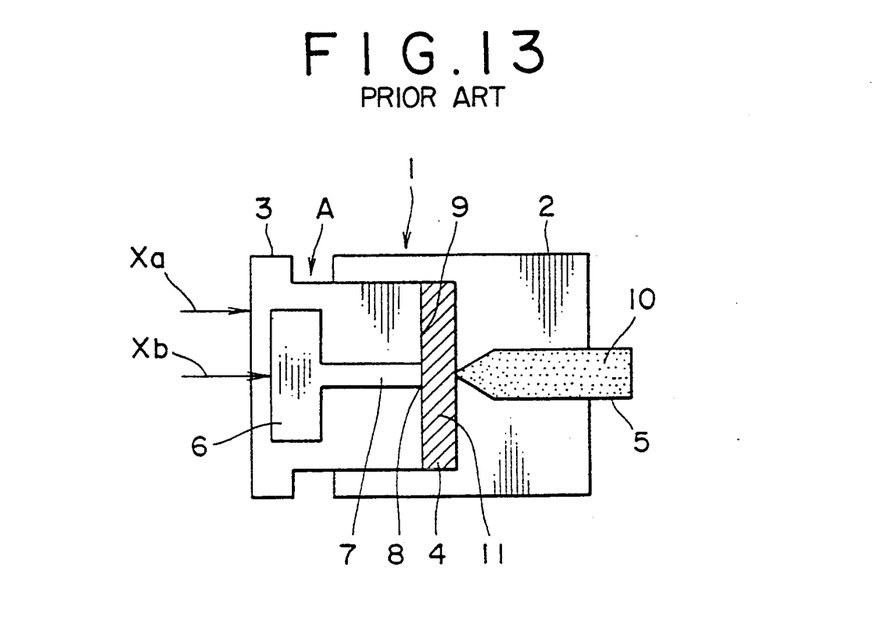
FIG. 13 is a typical sectional view of a conventional injection molding die, of assistance in explaining a principle on which an injection/compression molding method of the whole surface compression system is based.

This injection/compression molding method employs an injection/compression die 1 as shown in FIG. 13. The injection/compression die 1 consists of a fixed half die 2 and a movable half die 3 nested in the fixed half die 2 so as to form a cavity 4 having the shape of a molding. In FIG. 13, indicated at 5 is an injection nozzle and at 6 is an ejecting mechanism. A plurality of ejector pins 7 of the ejecting mechanism 6 are held so that the extremities 8 of the ejector pins are flush with the core surface 9 of the movable half die 3. The cavity 4 is expanded slightly and a molten resin 10 is injected through the injection nozzle 5 into the slightly expanded cavity 4, and then the movable half die 3 is pushed in the direction of the arrow Xa to compress the resin 10 injected into the expanded cavity 4 by a volume corresponding to a reduction in volume of the molten resin 10 on cooling. After the resin has been cooled, the movable half die 3 is moved away from the fixed half die 2 to open the injection/compression molding die 1, and then the ejecting mechanism 6 is operated to move the ejector pins 7 in the direction of the arrow Xb to eject a molding 11.

2. Core Compression System

The injection/compression molding method of this system is suitable for forming a thin portion of a small molding, such as an optical lens.

Figure 14:
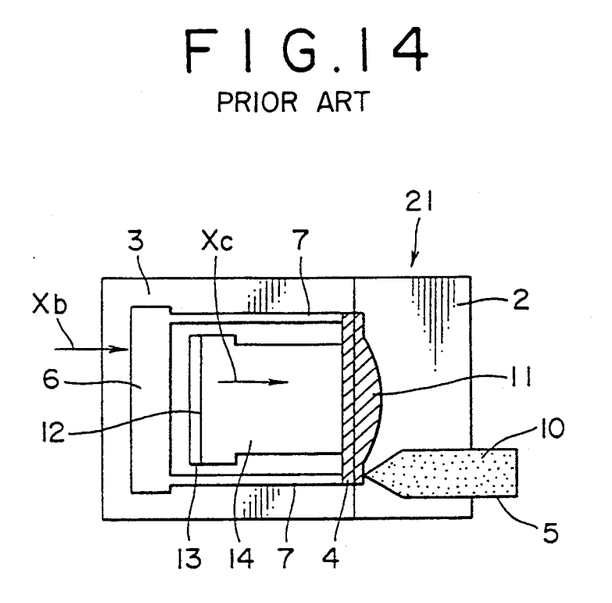
FIG. 14 is a typical sectional view of a conventional injection molding die, of assistance in explaining a principle on which an injection/compression molding method of the core compression system is based.

This injection/compression molding method employs an injection/compression die 21 as shown in FIG. 14, in which parts like or corresponding to those shown in FIG. 13 are designated by the same reference numerals and the description thereof will be omitted. As shown in FIG. 14, the injection/compression die 21 consists of a fixed half die 2 and a movable half die 3 joined to the fixed half die 2 to form a cavity 4. The movable half die 3 is provided with a chamber 13, and a core compressing mechanism 12 and a compressing core 14 capable of forming a portion of the core surface 9 of the movable half die 3 are contained in the chamber 13. When molding a resin 10, the fixed half die 2 and the movable half die 3 are joined together, the compressing core 14 is retracted to the left-hand end of the chamber 13 by the core compressing mechanism 12, and then the molten resin 10 is injected through the injection nozzle 5 into the cavity 4. The core compressing mechanism 12 advances the core 14 in the direction of the arrow Xc, namely, to the right as viewed in FIG. 14, to compress the resin 10 filling up the cavity 4 to reduce the volume of the cavity 4 by a decrement corresponding to a reduction in the volume of the resin 10 on cooling. After the resin 10 has cooled, the movable half die 3 is moved away from the fixed half die 2 to open the injection molding die 1, and then the ejecting mechanism 6 is actuated to advance the ejector pins 7 in the direction of the arrow Xb to eject a molding 11.

The injection molding die 1 of FIG. 13 for carrying out the injection/compression molding method of the whole surface compression system needs a mechanism A for absorbing the compression stroke. Although this injection molding die 1 is applicable to forming a molding having a simple shape, such as a substrate for an optical disk, it is difficult to apply the injection molding die 1 practically to forming a molding having blanks and protrusions in addition to flat portions, such as the half case of a magnetic tape cassette, because the injection molding die 1 needs to be formed in a very complex construction.

Although the injection molding die 21 of FIG. 14 for carrying out the injection/compression molding method of the core compression system does not need any mechanism for absorbing the compression stroke, the movable half die 3 inevitably has a complex construction because the core compressing mechanism 12 and the ejecting mechanism 6 needs to be built in the movable half die 3.

SUMMARY OF THE INVENTION

Accordingly, it is a first object of the present invention to provide an injection/compression molding method capable of forming a molding by using an injection molding die of a simple construction.

A second object of the present invention is to provide an injection molding die of a simple construction suitable for carrying out the injection/compression molding method of the present invention.

A third object of the present invention is to provide an injection/compression molding machine capable of carrying out the injection/compression molding method of the present invention.

An injection/compression molding method in a first aspect of the present invention comprises: forming a cavity in an injection molding die; holding ejector pins at positions where the extremities thereof are retracted from the core surface of the injection molding die for forming the inner surface of a molding so as to form recesses of a volume corresponding to a compression allowance; injecting a resin into injection molding die so as to fill up the cavity and the recesses with the resin; sealing the injection molding die to prevent the discharge of the resin injected into the injection molding die from the cavity; advancing some or all of the ejector pins by a predetermined distance to compress the resin filling up the cavity.

An injection molding die in a second aspect of the present invention for carrying out the injection/compression molding method in the first aspect of the present invention comprises a fixed half mold mounted on an injection/compression molding machine; a movable half mold; and a compressing mechanism provided with ejector pins, having the function of an ejecting mechanism for ejecting a mold, and capable of holding the ejector pins on the movable half die or on a movable unit of the injection/compression molding machine with the ejector pins retracted from the core surface of the movable half die so as to form recesses of a volume corresponding to a compression allowance and of advancing the ejector pins toward the cavity formed between the movable half die and the fixed half die.

The injection molding die of the present invention can be obtained through the simple modification of the conventional injection molding die and is capable of uniformly compressing the resin injected into the cavity to form a precision molding of a high quality.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

An injection molding die in a first embodiment according to the present invention will be described with reference to FIGS. 1 to 3.

Figure 1:
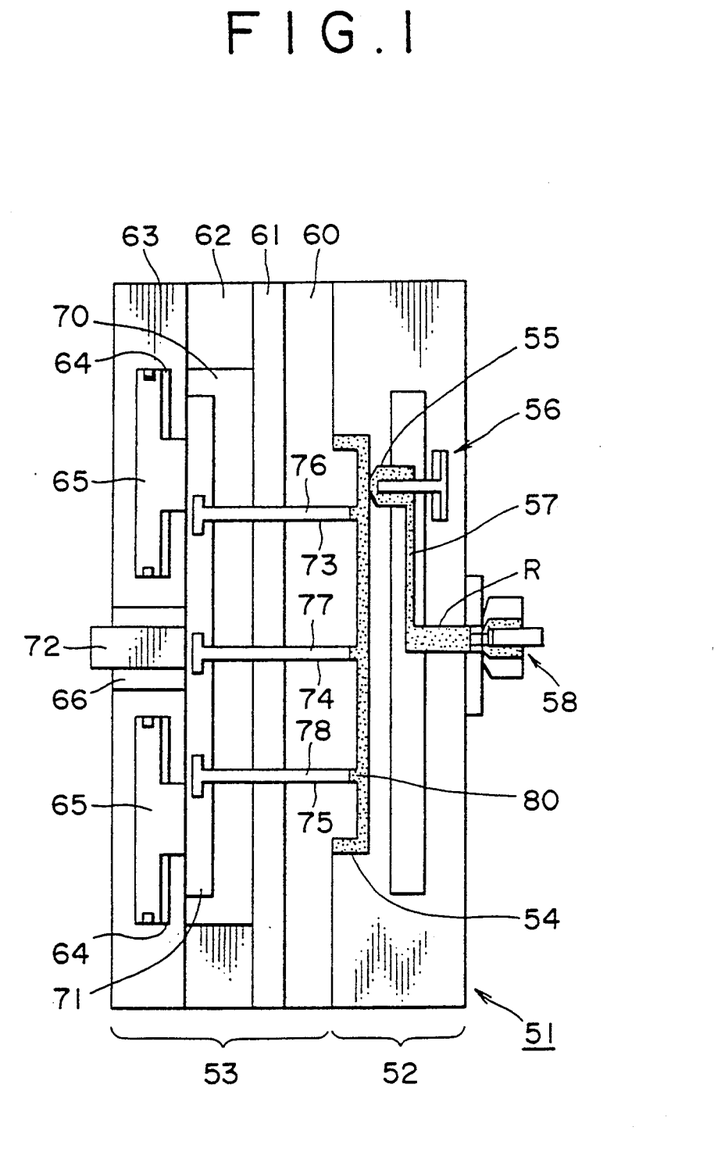
FIG. 1 is a sectional view of an injection molding die in a first embodiment according to the present invention for use on an injection/compression molding machine, in a state where a resin has been injected into the injection molding die and the injection molding die is ready to compress the resin.
Figure 2:
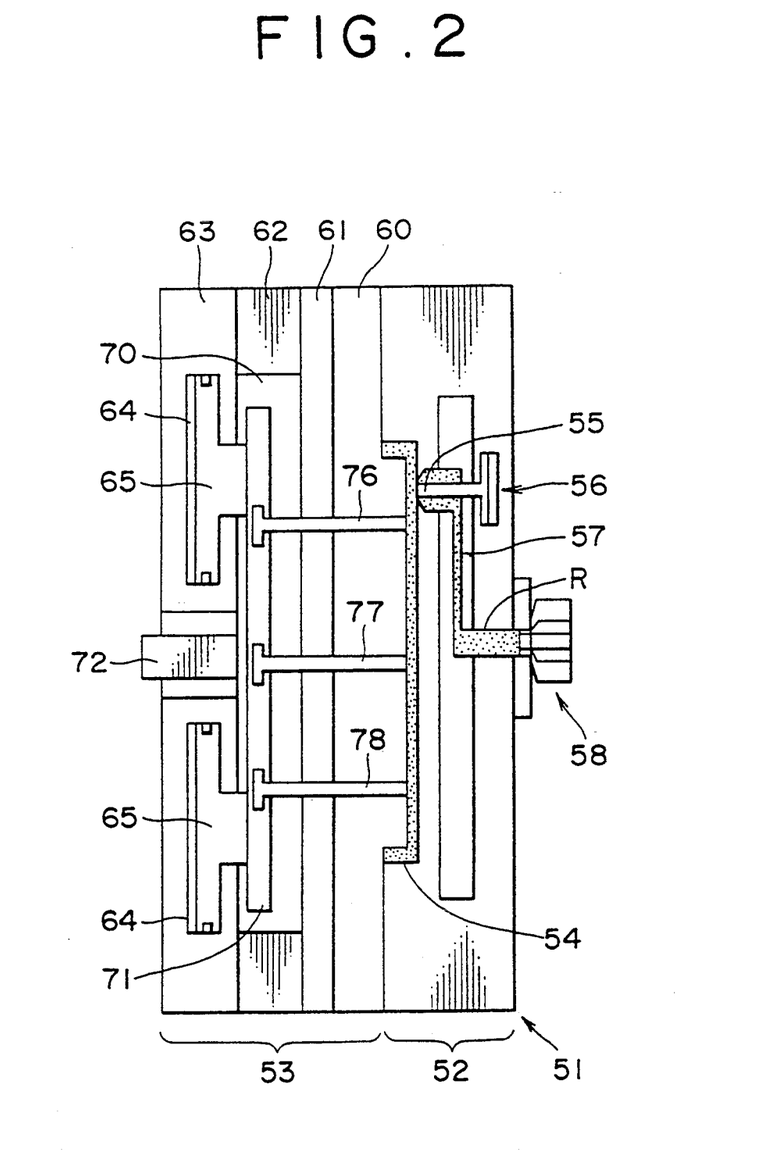
FIG. 2 is a sectional view of the injection molding die of FIG. 1 in a state where the resin injected into the injection molding die has been compressed.

Referring to FIG. 1, an injection molding die 51 consists of a fixed half die 52 and a movable half die 53. A cavity surface is formed in a surface of the fixed half die 52 facing the movable half die 53, and a core surface is formed on a surface of the movable half die 53 facing the fixed half die 52. When the injection molding die 51 is closed, the cavity surface of the fixed half die 52 and the core surface of the movable half die 53 form a cavity 54.

A gate 55 opens in the cavity surface of the fixed half die 52, and the gate 55 is opened or closed by a valve mechanism 56. The gate 55 communicates with a valve mechanism 58 provided on an injection/compression molding machine by means of a runner 57. A molten resin R is injected through the runner 57 and the gate 55 into the cavity 54.

The movable half die 53 comprises, as principal components, a core plate 60 having the core surface, a base plate 61, a spacer 62, and a compression plate 63. A compressing mechanism built in the compression plate 63 has a plurality of pistons 65 fitted respectively in a plurality of pressure chambers 64 formed in the compression plate 63. The pistons 65 are operated hydraulically. The pistons 65 are disposed behind an ejector plate 71, which will be described later.

An ejecting mechanism is formed in the movable half die 53. The ejecting mechanism comprises the ejector plate 71 placed in a chamber 70 formed by spacing the base plate 61 and the compression plate 63 by the spacer 62, an ejector rod 72 projecting backward from the ejector plate 71 through a through hole 66 formed in the compression plate 63 and connected to the compressing mechanism of the injection/compression molding machine, and a plurality of ejector pins 76, 77 and 78 fixed to the front surface of the ejector plate 71 and projecting forward through a plurality of through holes 73, 74 and 75 formed in the core plate 60 and the base plate 61.

An injection/compression molding method in accordance with the present invention for forming a molding M shown in FIG. 3 by using the thus constructed injection molding die 51 will be described hereinafter.

Referring to FIG. 1, the fixed half die 52 and the movable half die 53 are joined together, and the compressing mechanism is operated to move the ejector plate 71 backward together with the ejector pins 76, 77 and 78 so that the respective extremities of the ejector pins 76, 77 and 78 are retracted from the core surface of the core plate 60 and recesses corresponding to compression allowances 80 are formed in the core surface of the core plate 60. Then, valve mechanisms 56 and 58 are opened and the molten resin R is injected through the gate 55 into the cavity 54 to fill up the cavity 54 and the recesses corresponding to the compression allowances 80 with the molten resin R.

After the completion of the injection of the molten resin R, at least either the valve mechanism 56 or the valve mechanism 58 is closed. In FIG. 2, only the valve mechanism 55 is closed to close the gate 55. If the valve mechanism 56 is not closed and the valve mechanism 58 is closed, or if the injection molding die 51 is not provided with any valve mechanism corresponding to the valve mechanism 56 at the gate 55, pressure balance between the molten resin R filling up the cavity 54 and the molten resin R filling up the runner 57 must be taken into consideration in determining the compression allowances 80 (FIG. 1).

Then, the compressing mechanism is operated so that the pistons 65 pushes the ejector pins 76, 77 and 78 to extrude the molten resin R from the recesses corresponding to the compression allowances 80 into the cavity 54, whereby the molten resin R filling up the cavity 54 is compressed. When the molding M is a half case of a tape cassette, the compression is completed upon the advancement of the ejector pins 76, 77 and 78 to positions where the extremities of the ejector pins 76, 77 and 78 are flush with the core surface of the core plate 60 corresponding to the inner surface of the molding M.

Figure 3:
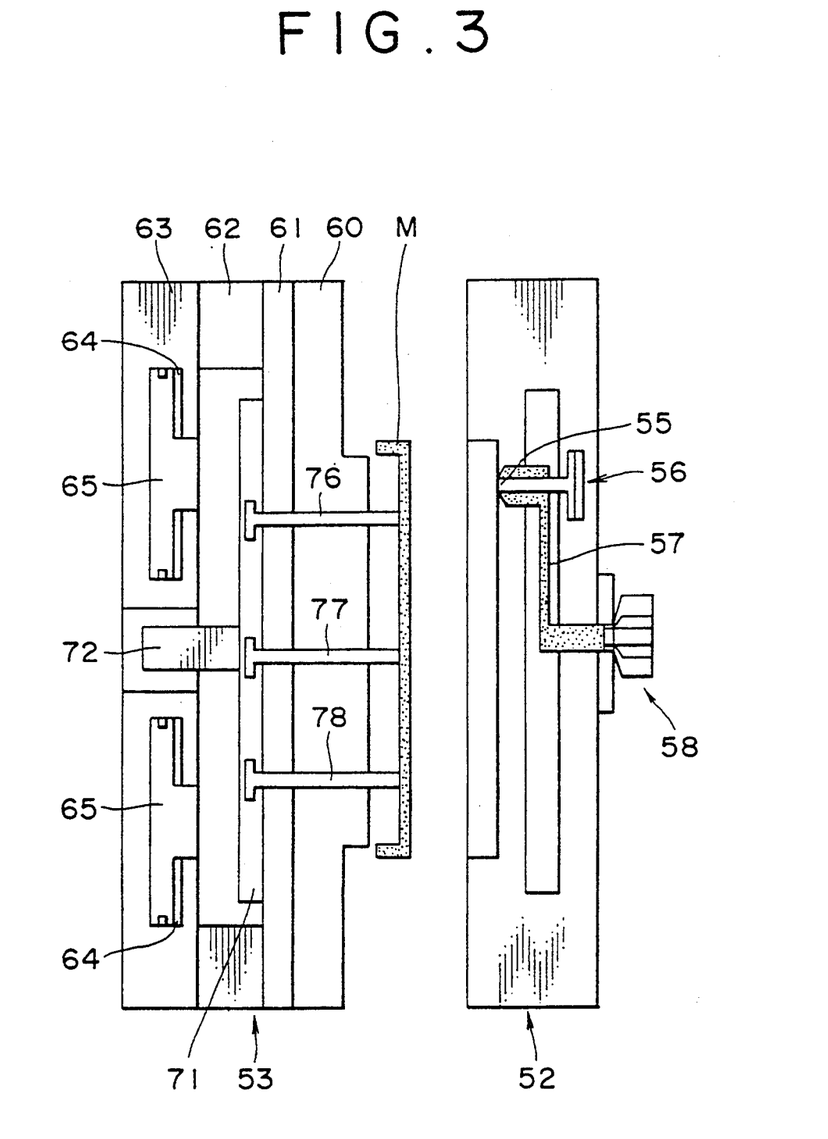
FIG. 3 is a sectional view of the injection molding die of FIG. 1 in a state where the injection molding die has been opened to remove the molding therefrom.

After the molten resin R filling up the cavity 54 has cooled, the movable half die 53 is separated from the fixed half die 52 as shown in FIG. 3, the hydraulic mechanism of the injection/compression molding machine is operated to make the ejector rod 72 push the ejector plate 71 forward so that the ejector pins 76, 77 and 78 project from the core surface of the core plate 60 to separate the molding M from the core plate 60 of the movable half die 53. Thus, one injection/compression molding cycle is completed.

Thus, the ejector pins 76, 77 and 78 are used both for separating the molding M from the core plate 60 of the movable half die 53 to eject the molding M from the injection molding die 51 and for compressing the molten resin R filling up the cavity 54.

The effect of the injection/compression molting method of the present invention was examined through the experimental injection/compression molding of the half case of a VHS tape cassette. The injection molding die 51 shown in FIGS. 1 to 3 was used for the experimental injection/compression molding. The effect of the injection/compression molding method verified by the experimental injection/compression molding will be described hereinafter with reference to FIGS. 4 to 8.

Figure 4:
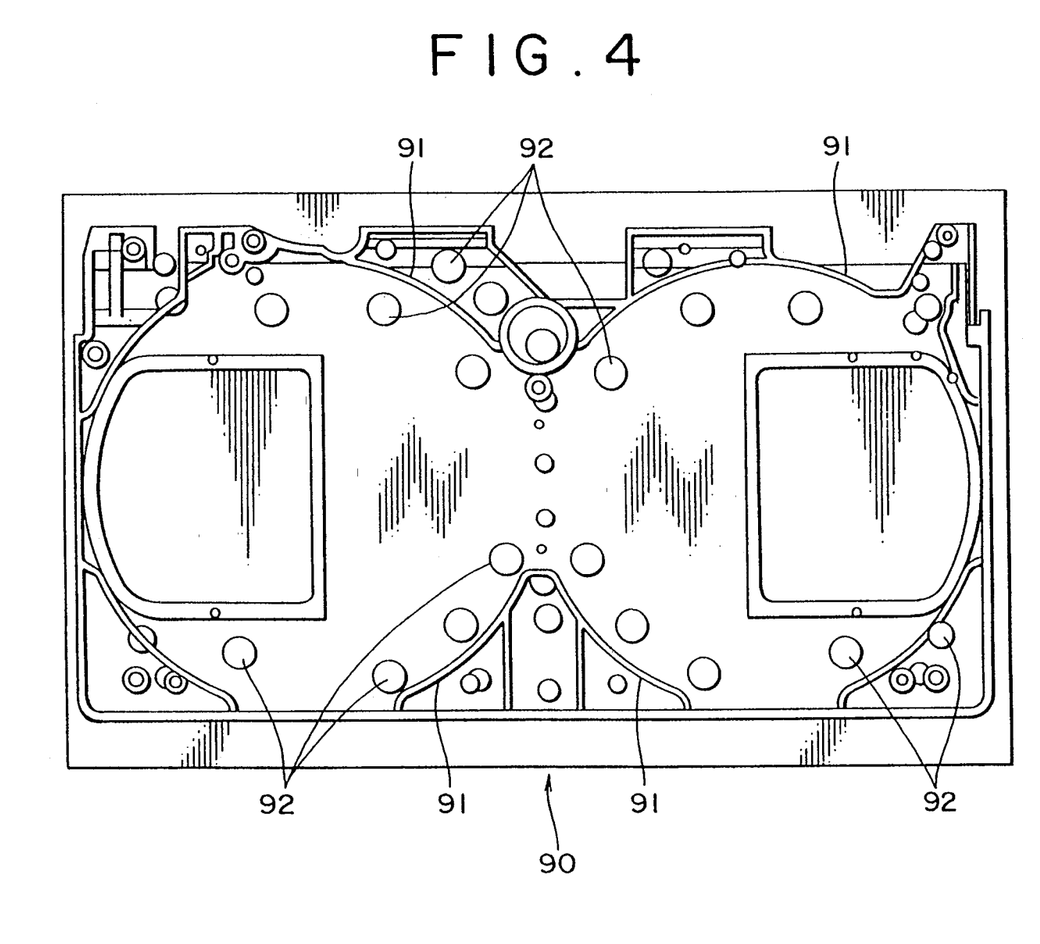
FIG. 4 is a plan view of an upper half case of a VHS tape cassette, showing the inner surface of the upper half case.

Referring to FIG. 4 showing the inner surface of the upper half case 90 of a VHS tape cassette, the upper half case 90 has ribs 91, and spots 92 are marked in the inner surface by the extremities of the plurality of ejector pins 76, 77 and 78- Generally, the injection molding die 51 for molding the upper half case 90 is provided with more than twenty ejector pins for each cavity 54, and most of the ejector pins are arranged in areas near the ribs 91 which are difficult to separate from the core surface.

Figure 5A:
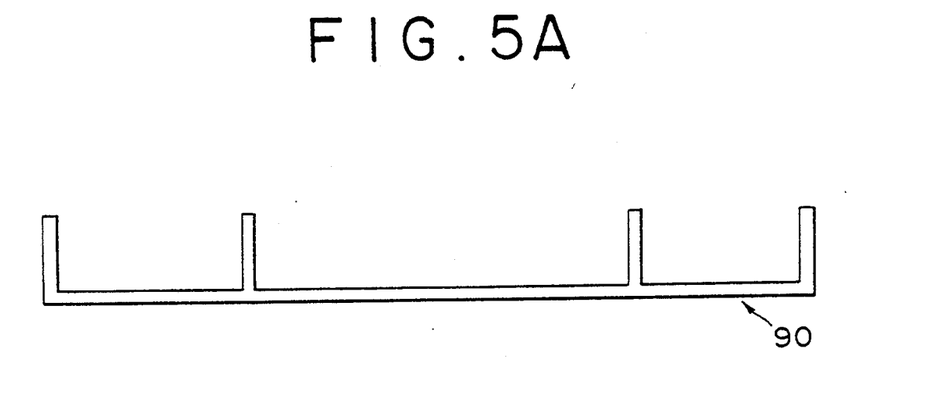
FIG. 5A is a schematic sectional view of a nondefective upper half case of a tape cassette formed by a conventional injection molding method.
Figure 5B:
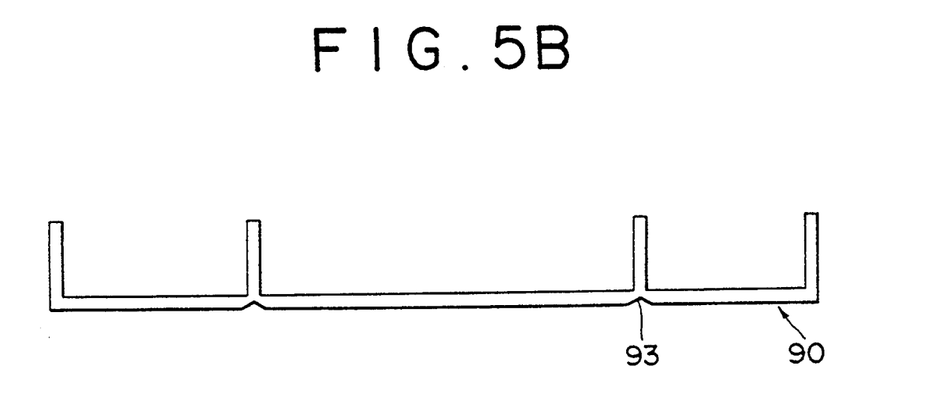
FIG. 5B is a schematic sectional view of an defective upper half case of a tape cassette formed by a conventional injection molding method.

FIG. 5A shows a nondefective upper half case 90 molded by the conventional injection molding method and FIG. 5B shows a defective upper half case 90 molded by the conventional injection molding method. When molding the upper half case 90 by the conventional injection molding method, shrinkage holes 93 are liable to be formed particularly in portions of the upper half case 90 which are difficult to separated from the die when insufficient pressure is applied to the molten resin filling up the cavity.

Figure 6:
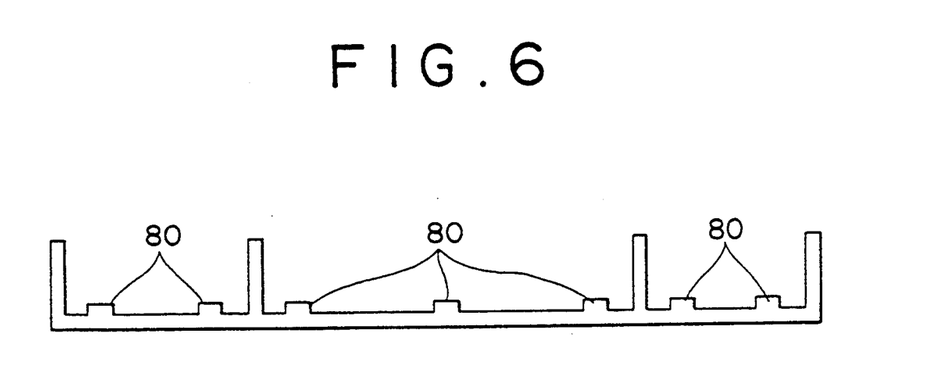
FIG. 6 is a sectional view of the resin in the cavity of the injection molding die in the state shown in FIG. 1.

The injection/compression molding method of the present invention forms the compression allowances 80, the number of which being equal to that of the ejector pins, as shown in FIG. 6 and extrudes the molten resin of the compression allowances 80 into the cavity with the ejector pins to compress the molten resin filling up the cavity. Therefore, shrinkage holes 93 as shown in FIG. 5B are not formed in the upper half case 90 on cooling and the upper half case 90 having a satisfactory appearance as shown in FIG. 5A can be produced.

Figure 7:
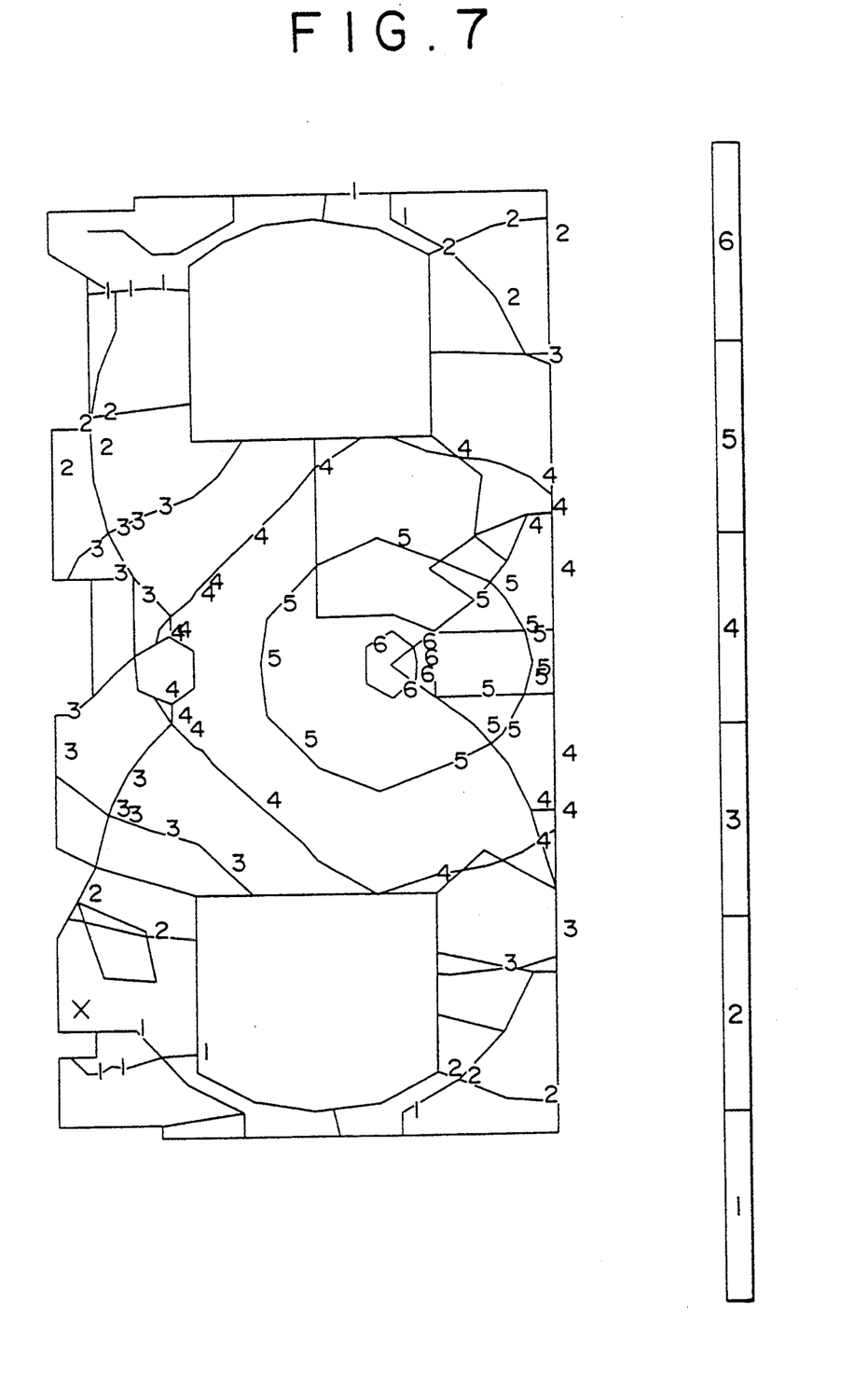
FIG. 7 is a diagram obtained through computer-aided analysis showing pressure distribution within an injection molding die in pressure holding time in carrying out a conventional injection/compression molding method.

Pressure distribution in the cavities of injection molding dies in the pressure holding time was estimated by computer-aided analysis. FIG. 7 shows pressure distribution in the cavity of an injection molding die in the pressure holding time in the injection molding cycle of a conventional injection/compression molding method and FIG. 8 shows pressure distribution in the cavity of an injection molding die in the pressure holding time in the injection molding cycle of the injection/compression molding method of the present invention, in which the pressure distribution is represented by isobaric lines and larger numerals indicate higher pressure.

Figure 8:
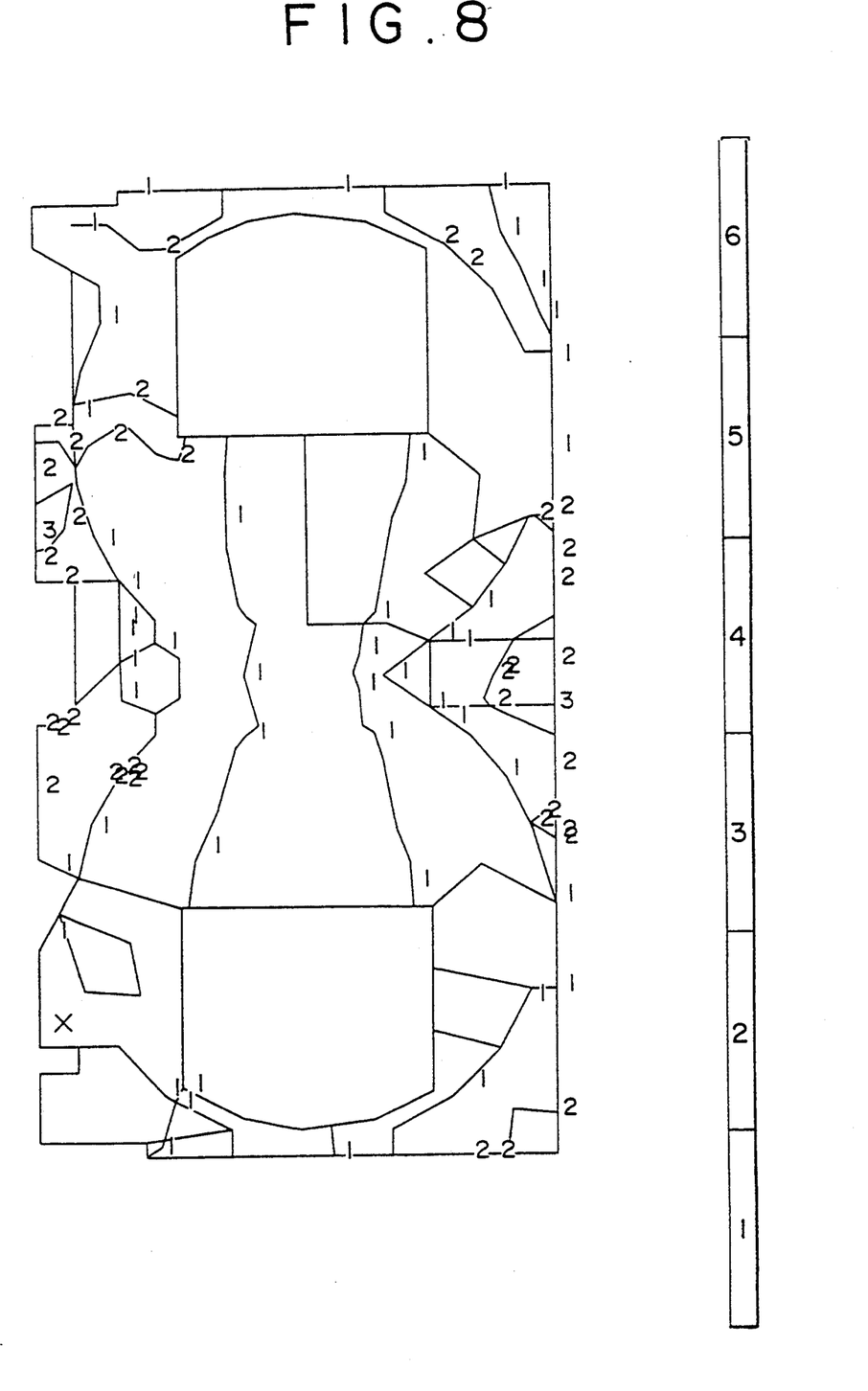
FIG. 8 is a diagram obtained through computer-aided analysis showing pressure distribution within an injection molding die in pressure holding time in carrying out an injection/compression molding method according to the present invention.

As is obvious from FIGS. 7 and 8, whereas the conventional injection/compression molding method needs to apply a very high pressure to the molten resin in regions near the gate to apply a sufficient pressure to the molten resin in regions remote from the gate, the injection/compression molding method of the present invention achieves substantially uniform pressure distribution in the cavity owing to the effect of the compressing action of the ejector pins equivalent to the distribution of a plurality of gates. Experimental injection/compression molding operation proved that the compressing action of the ejector pins arranged in areas near the ribs, in which shrinkage holes are liable to be formed, prevented shrinkage holes effectively and few shrinkage holes 93 as shown in FIG. 5B were formed, and the pressure applied to the molten resin was about 60% of the pressure to be applied to the molten resin when carrying out the conventional injection/compression molding method.

An injection molding die 51A in a second embodiment according to the present invention is a modification of the injection molding die 51 shown in FIG. 1. The injection molding die 51A in the second embodiment will be described hereinafter with reference to FIG. 9, in which parts like or corresponding to those of the injection molding die 51 shown in FIG. 1 will be designated by the same reference numerals and the description thereof will be omitted. A compressing mechanism incorporated into the injection molding die 51A shown in FIG. 9 is different from that employed in the injection molding die of FIG. 1.

Figure 9:
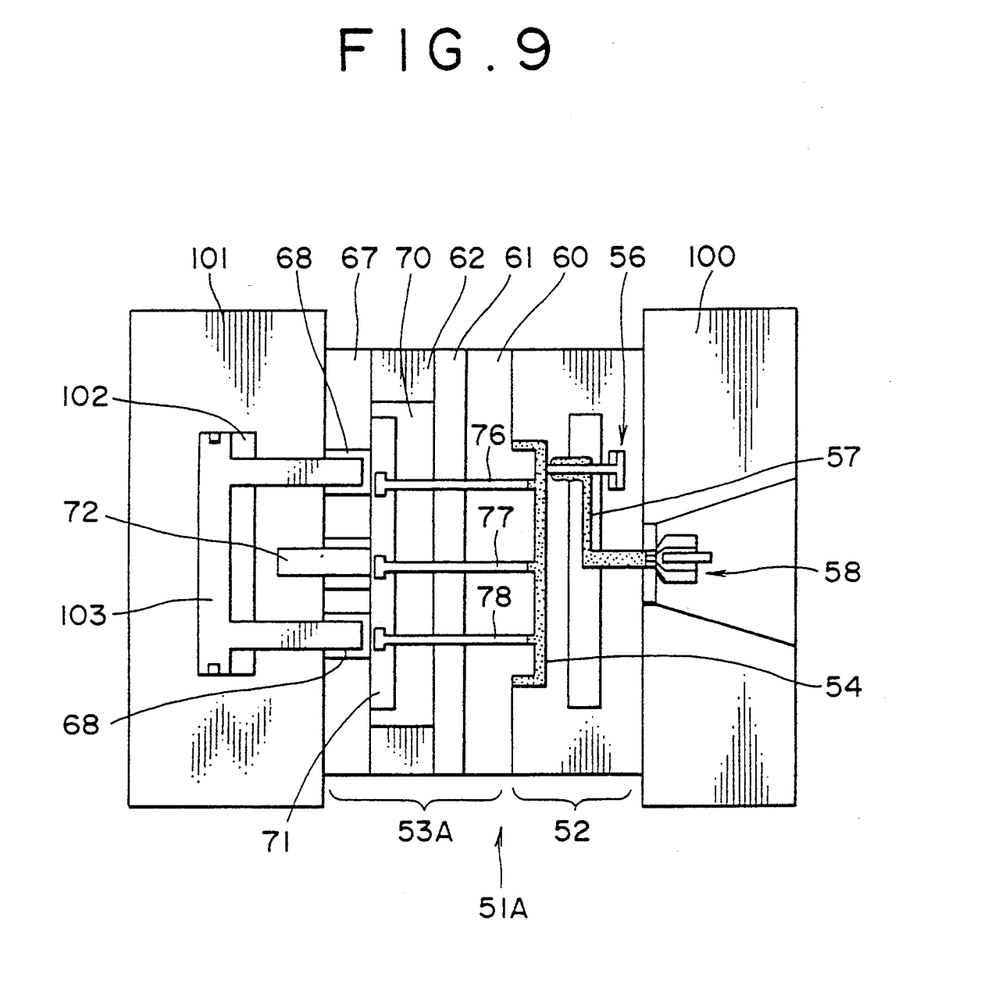
FIG. 9 is a sectional view of an injection molding die in a second embodiment according to the present invention for use on an injection/compression molding machine in a state where a resin has been injected into the injection molding die and the injection molding die is ready to be compress the resin.

Referring to FIG. 9, the injection molding die 51A has a fixed half die 52 attached to the fixed platen 100 of an injection/compression molding machine, and a movable half die 53A attached to the movable platen 101 of the injection/compression molding machine. Whereas the hydraulic mechanism including the pistons 65 of the compressing mechanism of the injection molding die 51, for operating the ejector pins 76, 77 and 78 in the first embodiment is built in the movable half die 53, the hydraulic mechanism including pistons 65 of a compressing mechanism employed in the second embodiment is built in the movable platen 101 of the injection/-compression molding machine.

Accordingly, the movable half die 53A has a simple moving plate 67 instead of the compression plate 63 provided with the pistons 65. A base plate 61 and the moving plate 67 are spaced apart by a spacer 62 to form a chamber 70, and an ejector plate 71 is placed in the chamber 70.

The compressing mechanism has a piston 103 having piston rods and fitted in a pressure chamber 102 formed in the movable platen 101. The piston rods of the piston 103 extend through through hales 68 formed in the moving plate 67 to push the ejector plate 71.

While all the ejector pins 76, 77 and 78 in the foregoing embodiments are shifted simultaneously by the same distance to form the same compression allowances 80, it is desired that the ejector pins are shifted individually to form different compression allowances and that the different compression allowances are compressed individually.

Figure 10:
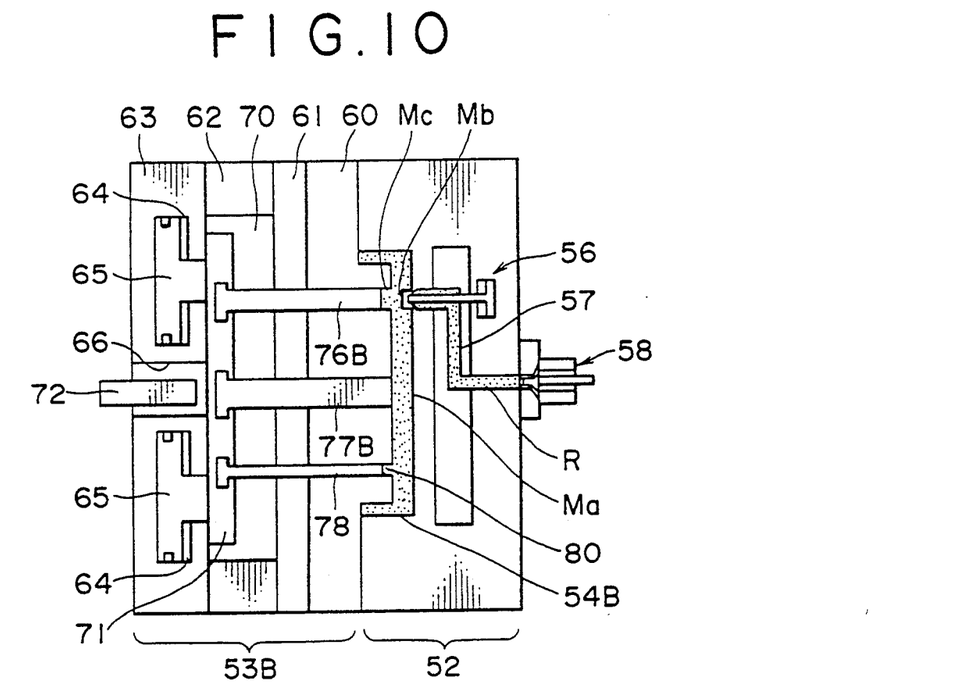
FIG. 10 is a sectional view of an injection molding die in a third embodiment according to the present invention for use on an injection/compression molding machine in a state where a resin has been injected into the injection molding die and the injection molding die is ready to be compress the resin.
Figure 11:
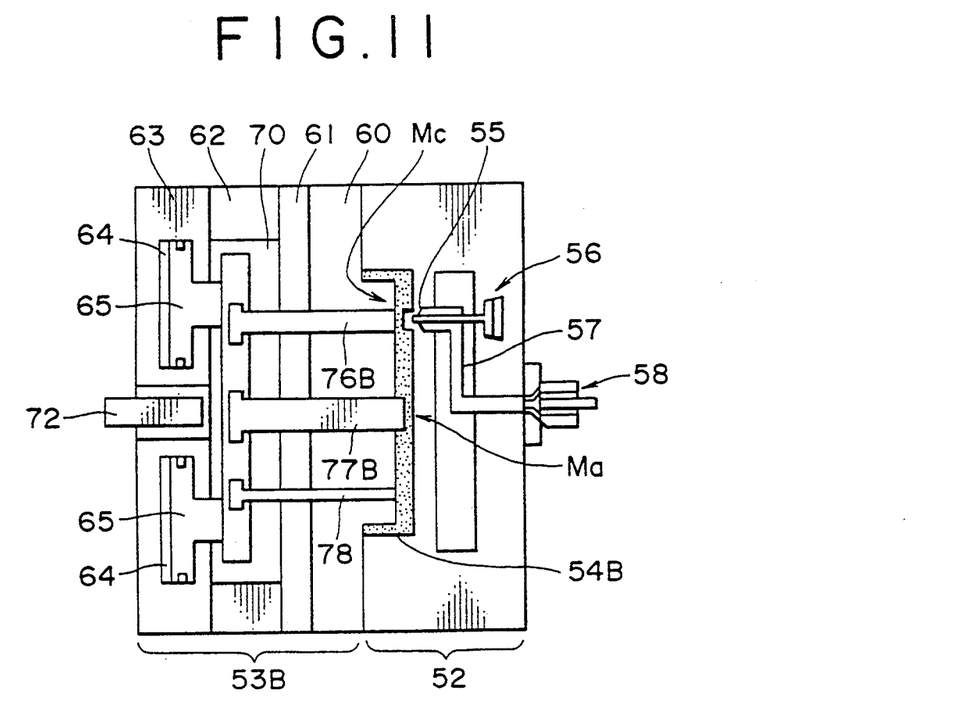
FIG. 11 is a sectional view of the injection molding die of FIG. 10 in a state where the injection molding die has completed compression.

An injection molding die 51B in a third embodiment according to the present invention will be described hereinafter with reference to FIGS. 10 and 11, in which parts like or corresponding to those of the injection molding die 51 shown in FIG. 1 are designated by the same reference numerals and the description thereof will be omitted. FIG. 10 is a sectional view of the injection molding die 51B in a state where a molten resin has been injected into the injection molding die 51B and the injection molding die 51B is ready to compress the molten resin and FIG. 11 is a sectional view of the injection molding die 51B in a state where the molten resin filling up the cavity of the injection molding die 51B are compressed.

Referring to FIG. 10, the injection molding die 51B, which is a modification of the injection molding die 51 shown in FIG. 1, has a fixed half die 52 and a movable half die 53B. The movable half die 53B is provided with an ejector pin 76B for forming a gate compression allowance Mc corresponding to a gate basin Mb, an ejector pin 77B for forming a thin compression allowance corresponding to a central thin portion Ma of the wall of, for example, a 3.5-inch MFD shell, and an ejector pin 78 for forming the same compression allowance 80 as that shown in FIG. 1. The ejector pin 77B is greater in both diameter and length than the ejector pin 77 of the first embodiment, the ejector pin 78 is equal in both diameter and length to the ejector pin 78 of the first embodiment, and the ejector pin 76B has a diameter somewhat smaller than that of the ejector pin 77B and somewhat greater than that of the ejector pin 78 and a length somewhat smaller than that of the ejector pin 77B and equal to that of the ejector pin 78.

The fixed half die 52 and the movable half die 53B provided with the ejector pins are joined together, the ejector pins 76B, 77B and 78 are retracted respectively to predetermined positions so as to form recesses as shown in FIG. 10, and then a molten resin R is injected into the injection molding die 51B to fill up the cavity 54B. After the molten resin R filling up the cavity 54B has cooled, the compressing mechanism is operated to push the ejector plate 71 with the piston 65 so that the gate compression allowance Mc, the thin compression allowance corresponding to the central thin portion Ma, and the compression allowance 80 are compressed with the ejector pins 76B, 77B and 78.

Since the ejector pin 77B is retracted from a position where the extremity thereof coincides with the inner surface of the central thin portion Ma when the molten resin R is injected into the cavity 54B, the flow of the molten resin R in the vicinity of the central thin portion Ma is not impeded by the ejector pin 77B. Since the ejector pin 76B is retracted from the core surface when the molten resin R is injected into the cavity 54B through the gate 55, an expanded space is formed around the gate basin Mb to enable the molten resin R to be flow easily into the cavity 54B. Therefore, the number of the gates 55 may be relatively small, and the ejector pin 77B compresses the central thin portion Ma efficiently, so that the molten resin R can be uniformly compressed in the cavity 54B by a relatively low pressure. Thus, the injection molding die 51B in the third embodiment enhances the yield per unit time and productivity of the injection/compression molding machine.

An injection molding die 51C in a third embodiment according to the present invention, which is a modification of the injection molding die 51 shown in FIG. 1, will be described hereinafter with reference to FIG. 12, in which parts like or corresponding to those of the injection molding die 51 shown in FIG. 1 are designated by the same reference numerals and the description thereof will be omitted.

The injection molding die 51C is designed to compress only portions of a molding M remote from the gate 55, in which shrinkage holes are liable to be formed.

Figure 12:
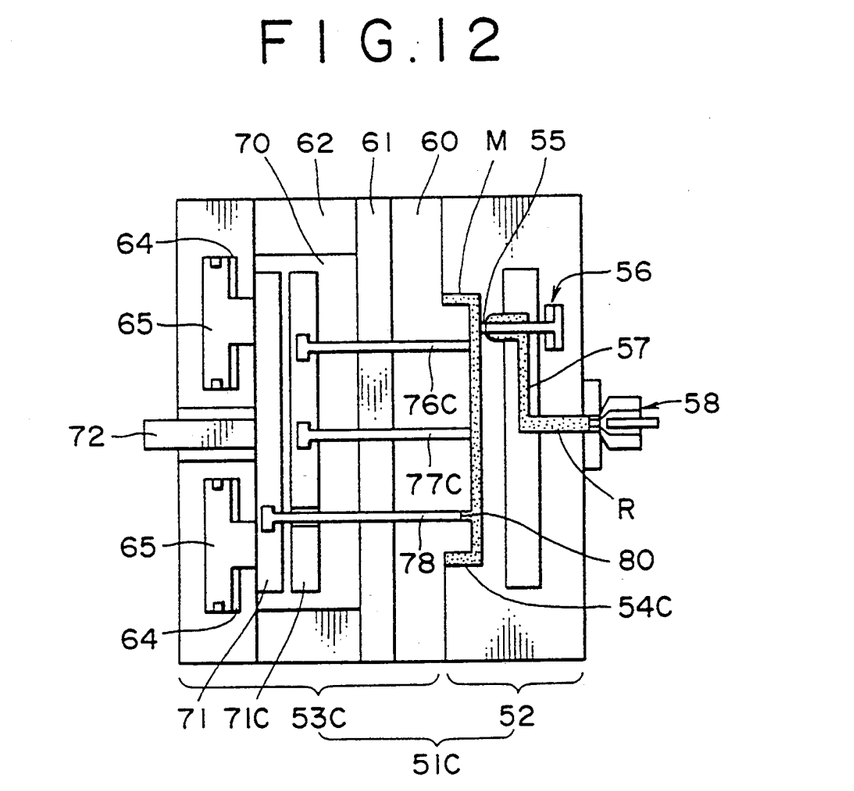
FIG. 12 is a sectional view of an injection molding die in a fourth embodiment according to the present invention in a state where a resin has been injected into the injection molding die and the injection molding die is ready to compress the resin.

Referring to FIG. 12, the injection molding die 51C has a fixed half die 52 and a movable half die 53C provided with a chamber 70. The chamber 70 contains a first ejector plate 71 with some of the ejector pins fixed thereto and a second ejector plate 71C with the rest of the ejector pins fixed thereto disposed in front of the first ejector plate 71. The first ejector plate 71 and the second ejector plate 71C are movable toward and away from the cavity 54C. An ejector pin 78, which is the same as the ejector pin 78 of the first embodiment, is fixed to the first ejector plate 71, and ejector pins 76C and 77C are fixed to the second ejector plate 71C. The ejector pin 78 extends through a through hole formed in the second ejector plate 71C into the cavity 54C. While the ejector pins 76C and 77C are used only for separating the molding M from the movable half die 53C, the ejector pin 78 is used both for compressing the compression allowance 80 and for separating the molding M from the movable half die 53C.

The fixed half die 52 and the movable half die 53C are joined together, the ejector pins 76C, 77C and 78 are retracted respectively to predetermined positions shown in FIG. 12, and the molten resin R is injected into the injection molding die 51C to fill up the cavity 54C with the molten resin R. After the molten resin R has cooled in the cavity 54C, the compressing mechanism is operated to push the first ejector plate 71 with the pistons 65 to a position where the first ejector plate 71 will not push the second ejector plate 71C so that the compression allowance 80 corresponding to a portion of the molding M remote from the gate 55, in which a shrinkage hole is liable to be formed, is compressed with the ejector pin 78.

After the molding M formed in the cavity 54C has cooled, the movable half die 53C is separated from the fixed half die 52, and then the hydraulic mechanism of the injection/compression molding machine is operated to push the first ejector plate 71 with the ejector rod 72 so that the first ejector plate 71 and the second ejector plate 71C are shifted simultaneously toward the cavity 54C to separate the molding M from the movable half die 53C with the ejector pins 76C, 77C and 78.

Although the preferred embodiments of the present invention have been described as applied to molding the upper half case of the VHS tape cassette, the injection/compression molding method of the present invention is applicable also to forming compact, lightweight moldings, such as the cases of VTRs integrally combined with a TV camera and portable personal computers and to forming precision moldings, such as resin decks for supporting the tape transport of VTRs and audio apparatus.

As is apparent from the foregoing description, the injection/compression molding method of the present invention has the following excellent advantages.

1. Enhancement of Productivity and Improvement of Molding Accuracy

Since the molding pressure required by the present invention is lower than that required by the conventional injection/compression molding method by about 50% to about 60%, the yield per unit time and productivity of the injection/compression molding machine are enhanced. Since the molding is compressed uniformly in the cavity, the molding will not warp and can be formed in a high accuracy.

2. Curtailment of the Molding Cycle Time

Whereas the conventional injection/compression molding method is unable to start a plasticizing process until a pressure holding process is completed, the injection/compression molding method of the present invention is able to carry out the pressure holding process and the plasticizing process simultaneously to curtail the molding cycle time because the pressure holding process is not carried out by the injection/compression molding machine but by the injection molding die. Thus, the injection/compression molding method of the present invention is suitable for the mass production of moldings.

3. Availability of the Conventional Injection Molding Die

The injection/compression molding method of the present invention does not need any special injection molding die and is capable of being carried out by using a modified conventional injection molding die additionally provided with a compressing mechanism. The compressing mechanism may be provided on the injection/compression molding machine for the further improved economic effect.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. An injection molding die comprising:
    a fixed half die;
    a movable half die having a core surface for forming a surface of a molding to be formed, said movable half die being joined to the fixed half die to form a cavity in the injection molding die;
    ejector pins axially movably supported on the movable half die; and
    a compressing mechanism which holds some of the ejector pins respectively at positions where the extremities of said some of the ejector pins are retracted from the core surface of the movable half die to form recesses corresponding to compression allowances int he core surface, said compressing mechanism advancing the ejector pins toward the cavity after a molten resin has been injected into the injection molding die and fills the cavity and the recesses,
    wherein said some of said ejector pins are fixed to a first ejector plate, ad the rest of the ejector pins are fixed to a second ejector plate, and wherein said compressing mechanism controls the first ejector plate to compress the resin in the recesses corresponding to the compression allowances with said some of sad ejector pins and subsequently both ejector plates to advance the ejector pins thereon to eject the molding from said cavity.

2. An injection molding die according to claim 1, wherein respective ejector pins are different in diameter and/or length from other said ejector pins.

3. An injection/compression molding machine comprising:
    a fixed platen fixedly holding a fixed half die of an injection molding die;
    a movable platen fixedly holding a movable half die of the injection molding die, said movable half die having a core surface for forming a surface of a molding to be formed, said movable half die being joined to the fixed half die to form a cavity in the injection molding die; and
    a compressing mechanism with ejector pins which is provided on the movable platen, which holds some of the ejector pins respectively at positions where the extremities of said some of the ejector pins are retracted from the core surface of the movable half die to form recesses corresponding to compression allowances in the core surface, ad which advances the ejector pins toward the cavity after a molten resin has been injected into the injection molding die to fill up the cavity and the recesses,
    wherein said some of said ejector pins are fixed to a first ejector plate, the rest of said ejector pins are fixed to a second ejector plate, and wherein said compressing mechanism controls the first ejector plate to compress the resin in the recesses corresponding to the compression allowances with said some of said ejector pins and subsequently both ejector plates to advance the ejector pins thereon to eject the molding from the cavity.

4. An injection/compression molding machine according to claim 3, wherein respective ejector pins are different in diameter and/or length from other of said ejector pins.

5. An injection/compression molding method comprising the steps of:

forming a cavity in an injection molding die using a fixed half die and a movable half die, said movable half die having a core surface for forming a surface of a molding to be formed, ejector pins, and a plurality of recesses corresponding to compression allowances in the core surface, said movable half die being joined to the fixed half die to form said cavity in the injection molding die;

fixing some of said ejector pins to a first ejector plate;

fixing the rest of the ejector pins to a second ejector plate;

sealing the cavity to prevent molten resin form flowing out of said cavity by pressing said movable half die against said fixed half die;

injecting a molten resin into said cavity while it is maintained sealed to fill the cavity and said plurality of recesses; and using a compression mechanism to advance said first ejector plate and said some of said ejector pins toward said cavity to compress the resin in said plurality of recesses corresponding to the compression allowances int he core surface and subsequently advance both ejector plates with the ejector pins thereon to eject the molding form the cavity.

* * * * *